(12) United States Patent
Edmonds et al.

(10) Patent No.: US 12,510,607 B2
(45) Date of Patent: Dec. 30, 2025

(54) DEVICE UTILISING ELECTRONIC ZEEMAN SPLITTING

(71) Applicant: Element Six Technologies Limited, Oxfordshire (GB)

(72) Inventors: Andrew Mark Edmonds, Oxfordshire (GB); Matthew Lee Markham, Oxfordshire (GB); Pierre-Olivier François Marc Colard, Oxfordshire (GB)

(73) Assignee: Element Six Technologies Limited, Oxfordshire (GB)

( * ) Notice: Subject to any disclaimer, the term of this patent is extended or adjusted under 35 U.S.C. 154(b) by 132 days.

(21) Appl. No.: 18/579,692

(22) PCT Filed: Jul. 18, 2022

(86) PCT No.: PCT/EP2022/069980
§ 371 (c)(1),
(2) Date: Jan. 16, 2024

(87) PCT Pub. No.: WO2023/001728
PCT Pub. Date: Jan. 26, 2023

(65) Prior Publication Data
US 2024/0345186 A1    Oct. 17, 2024

(30) Foreign Application Priority Data
Jul. 19, 2021  (GB) ...................... 2110314

(51) Int. Cl.
  *G01R 33/032*  (2006.01)
  *G01R 33/00*   (2006.01)
  *G01R 33/26*   (2006.01)
(52) U.S. Cl.
  CPC ....... *G01R 33/032* (2013.01); *G01R 33/0082* (2013.01); *G01R 33/26* (2013.01)

(58) Field of Classification Search
  CPC .. G01R 33/032; G01R 33/0082; G01R 33/26; G01R 33/0029
  (Continued)

(56) References Cited

U.S. PATENT DOCUMENTS 3,325,757  A    6/1967  Gang
  10,571,498 B2   2/2020  Chipaux et al.
  (Continued)

FOREIGN PATENT DOCUMENTS

JP    2015529328 A   10/2015
  WO    2009073736 A1   6/2009
  (Continued)

OTHER PUBLICATIONS

Kim, S. H. et al., "Temperature Compensation of NdFeB Permanent Magnets," In Proceedings of the 1997 Particle Accelerator Conference (CAT No. 97CH36167) vol. 3: 3227-3229, IEEE, 1997.
(Continued)

*Primary Examiner* — Christopher P Mcandrew
(74) *Attorney, Agent, or Firm* — Armstrong Teasdale LLP (57) ABSTRACT

A device that utilises an electronic Zeeman splitting effect comprises a solid-state material that comprises at least one spin defect, a magnetic field generator configured to generate a bias magnetic field, and a compensation system to compensate for an effect of changes in temperature on the bias magnetic field. The compensation system comprises a temperature sensor configured to measure any of a temperature and a change in temperature of the magnetic field generator, and a computer device configured to determine a change in the bias magnetic field as a result of a change in the measured temperature or the measured change in temperature. The computer device is further configured to adjust a predetermined bias magnetic field value using the determined change in bias magnetic field and using the value as
(Continued)

an input to the compensation system to compensate for the effect of changes in temperature on the bias magnetic field.

14 Claims, 4 Drawing Sheets

(58) Field of Classification Search
USPC .......................................................... 324/304
See application file for complete search history.

(56) References Cited

U.S. PATENT DOCUMENTS

| | | |
|---|---|---|
| 2010/0315079 A1 | 12/2010 | Lukin et al. |
| 2015/0212168 A1* | 7/2015 | Shah .................... G01N 24/006 |
| | | 324/304 |
| 2016/0077167 A1* | 3/2016 | Heidmann ............ G01Q 60/08 |
| | | 250/459.1 |
| 2016/0139216 A1* | 5/2016 | Ueno ................. G01R 33/0327 |
| | | 324/304 |
| 2016/0238672 A1 | 8/2016 | Schaaf |
| 2017/0077665 A1 | 3/2017 | Liu et al. |
| 2017/0089956 A1 | 3/2017 | Ausserlechner |
| 2017/0316795 A1 | 11/2017 | Heidmann |
| 2017/0343617 A1* | 11/2017 | Manickam ........... G01R 33/032 |
| 2018/0275210 A1* | 9/2018 | Luzod .................... G01R 33/26 |
| 2019/0018076 A1 | 1/2019 | Hahn et al. |
| 2019/0145919 A1* | 5/2019 | Clevenson ........... G01R 33/323 |
| | | 324/304 |
| 2019/0146045 A1* | 5/2019 | Niu ...................... G01R 33/032 |
| | | 324/304 |
| 2020/0264242 A1 | 8/2020 | Mohan |

FOREIGN PATENT DOCUMENTS

| | | |
|---|---|---|
| WO | 2014051886 A1 | 4/2014 |
| WO | 2016066532 A1 | 5/2016 |

OTHER PUBLICATIONS

Anders, J. et al., "Progress in miniaturization and low-field nuclear magnetic resonance" Journal of Magnetic Resonance, 322: 106860 (2021).

Shim, J. H. et al., Accepted Manuscript "Multiplexed sensing of magnetic field and temperature in real time using a nitrogen-vacancy spin ensemble in diamond," now Published as Physical Review Applied, 17(1): 014009 (2022).

GB Search Report issued for Application No. GB2110314.8, dated Apr. 22, 2022 (4 pages).

GB Search Report issued for Application No. GB2210491.3, dated Dec. 23, 2022 (4 pages).

International Search Report and Written Opinion issued for Application No. PCT/EP2022/069980, dated Nov. 15, 2022 (16 pages).

* cited by examiner

DEVICE UTILISING ELECTRONIC ZEEMAN SPLITTING

CROSS-REFERENCE TO RELATED APPLICATIONS

This application is a § 371 national stage of International Application No. PCT/EP2022/069980, filed Jul. 18, 2022, which claims priority to Great Britain Application No. 2110314.8, filed Jul. 19, 2021.

FIELD

The invention relates to the field of devices that utilise an electronic Zeeman effect, in particular devices that comprise diamond material.

BACKGROUND

Sensor devices such as magnetometers can be formed using single crystal diamond sensors that incorporate spin defects in their crystal lattice. An example of a spin defect is the nitrogen-vacancy (NV) centre. Exemplary magnetometers are described in WO2009/073736 and US2010/0315079.

A critical aspect to the principle of a spin-based magnetic-field sensor is the electronic-Zeeman effect, which describes the interaction between the magnetic dipole moment of the unpaired electrons in a defect and a magnetic field. In a defect such as the NV centre in diamond that has an electronic spin(S) of 1 this results in a splitting in the energy of the ground-state spin levels ($M_s\pm1$) that is, to first-order, proportional to the magnetic-field projected along the <111>-symmetry axis of the defect. This splitting in energy may be measured by performing a sweep of an applied RF frequency whilst optically exciting the defect with green light and detecting either the degree of NV-related luminescence (an optically-detected magnetic resonance, or ODMR modality) or by measuring the photo-current generated (photo-detected magnetic resonance, or PDMR). With knowledge of this energy splitting the magnetic field may then be determined.

Magnetometers typically use a bias magnet to apply a fixed and known magnetic field. This bias magnetic field serves different purposes, depending on the exact approach being used.

In implementations which utilise static or time-varying application of microwave-frequency waves (referred to as implementation 1), the bias field ($B_{bias}$) serves to separate, in frequency, the two $\Delta M_s \pm 1$ transitions, as well as the (up-to) four pairs of lines associated with the (up-to) four symmetry-related sites that NV centres may occupy (the four permitted <111> axes). In this way the resonance lines are sufficiently separated in frequency such that each of the (up-to) eight sets of resonance lines may be individually addressed, as shown in in FIG. 1, in which a magnetic field is oriented along an angle of (18,29) degrees (spherical-polar theta, phi notation), where [111] is defined as (54.7,45) degrees. To observe all the resonance lines the orientation of $B_{bias}$ must be chosen such that it makes a different angle to each symmetry <111> axis. Then, by measuring their position in frequency the total vector magnetic field ($B_{total}$) incident on the diamond may be extracted, either using their absolute positions or their separation. In the latter case the issue of temperature variations in diamond, which causes a shift in position of the lines due to a change in the zero-field parameter of the NV centre, is negated. The magnetic field of interest is then extracted via $B_{unknown}=B_{total}-B_{bias}$, with $B_{bias}$ either known due to the design of the magnetic field, or it may be determined by the sensor itself by measuring the magnetic field with the sensor in a shielded container. A typical value of $B_{bias}$ in this implementation is ~1-10 mT.

An alternative approach to a magnetic-field sensor using the NV centre in diamond (referred to as implementation 2) removes the need for the application of microwaves (an "RF free" technique) which has advantages in some applications, particularly those interested in making measurements at cryogenic temperatures. This is because the application of RF causes heating. In this case a precise bias field of $B_{bias}=102.4$ mT is required in order to leverage the level anti-crossing in the triplet ground state which reduces the luminescence output of NV centres. A change in magnetic field (assumed to be from a change in $B_{unknown}$) then causes an increase in luminescence.

The electronic-Zeeman interaction and the application of a known static magnetic field is also crucial to other sensing modalities/usage cases for spin-defects in solid-state materials. For example, NV in diamond has also been demonstrated as an RF spectrum analyser, where a magnetic-field gradient is set up across a diamond plate, as described in WO2016/066532. By measuring the luminescence as a function of position across the diamond sample (corresponding to varying B) the spectrum of RF frequencies incident on the diamond sample may be resolved.

Additionally, diamond has also been demonstrated as a MASER utilising the NV centre (described in US20170077665A1) and the Zeeman interaction. In this case a controlled magnetic field, in combination with a resonator, is used to tune the emission frequency of the generated microwaves.

SUMMARY

The NV centre when used for magnetometry has been described as being a "calibration-free" means to measure a magnetic field. However, from the descriptions above it can be appreciated that in both cases $B_{bias}$ must be known and must be stable, because the NV centre measures is $B_{total}$, and $B_{unknown}$ is measured by using subtracting $B_{bias}$ from $B_{total}$.

It is typical to utilise one/more permanent magnets, often made of neodymium (NeFeB) due to their high flux density/weight, in such setups to provide $B_{bias}$. This may be preferential over use of electromagnetic coils due to the size and simplicity of the setup, as well as short-term stability. Generation of a stable $B_{bias}$ by electromagnetic coils requires a stable current source.

It has been appreciated that variations in temperature of the diamond need to be considered. However, an area that has not been previously considered is the issue of changes in temperature and the affect that this has on $B_{bias}$. As ambient temperature changes, permanent magnets display a corresponding reversible change in their magnetic field.

Considering implementation 1, a NeFeB magnet displays a variation in magnetic field of ~0.12%/° C. at temperatures below the demagnetisation temperature (for example, −130° C. to 80° C.). Taking a $B_{bias}$ value of 1 mT, this means a 0.1° C. change in temperature will change $B_{bias}$ by 120 nT. For an NV-based diamond sensor measuring $B_{total}$ over a period of time, for example for navigation or denied-GPS applications, this will lead to an erroneous measurement of $B_{unknown}$ of this order. Repeating a "zeroing" procedure by placing the sensor in a shielded box periodically is neither desirable nor practical for many applications.

For some RF-free applications described in implementation 2, temperature stability may be better than that of implementation 1 by virtue of the setup. For example, RF-free applications may be used in a cryostat for controlled low-temperature measurements. However, in non-temperature-controlled situations, the influence on $B_{bias}$ instability may be even more severe as the field required is higher; a shift of 0.1° C. in this case changes $B_{bias}$ by >0.012 mT.

It is therefore apparent that, in order to produce a magnetic-field sensor using NV centres in diamond that is stable and drift-free over long durations, stable bias fields are also required, or the effect of $B_{bias}$ with varying temperature must be compensated/measured in an independent manner. It is an object to provide solutions to this problem.

In the other sensing modalities/usages previously discussed, a stable applied magnetic field is also crucial. For example, in the RF spectrum analyser case the stability of the applied magnetic-field gradient influences the accuracy of the measured microwave frequencies, whilst in the case of a MASER the static field influences the efficiency and stability of the emitted microwaves.

According to a first aspect, there is provided a device that utilises an electronic Zeeman splitting effect. The device comprises a solid-state material that comprises at least one spin defect. The device also comprises a magnetic field generator configured to generate a bias magnetic field, and a compensation system to compensate for an effect of changes in temperature on the bias magnetic field. This ensures that where temperature variations affect the bias magnetic field, the compensation ensures that the device can still give an accurate reading. The compensation system comprises a temperature sensor configured to measure any of a temperature and a change in temperature of the magnetic-field generator. The compensation system further comprises a computer device configured to determine a change in the bias magnetic field as a result of a change in the measured temperature or the measured change in temperature, the computer device being further configured to adjust a predetermined bias magnetic field value using the determined change in bias magnetic field and using the value as an input to the compensation system to compensate for the effect of changes in temperature on the bias magnetic field. This compensation does not change any parameters of the bias magnetic-field generator directly, but just uses computed values to account for changes in the bias magnetic field.

Examples of suitable solid-state materials include diamond material and silicon carbide.

In the example where the solid-state material is diamond material, the diamond material may be selected from any of a nanocrystal, a bulk diamond sample, or a composite diamond sample comprising diamond regions with different properties.

As an option, the spin defect is selected from any of a negatively charged nitrogen vacancy centre, a silicon-vacancy centre, a nickel-related defect, a chromium-related defect, a tin-vacancy centre and a germanium vacancy centre.

In an optional embodiment, the solid-state material is the temperature sensor, the solid-state material being in thermal equilibrium with the magnetic-field generator and the change in temperature being determined by the drift in the zero-field splitting value of the spin defect.

In an optional embodiment, the device comprises an intermediate material disposed between and in contact with both the solid-state material and the magnetic field generator, the intermediate material being selected to conduct heat between the solid-state material and the magnetic field generator.

As an option, the device is a magnetometer. In this case, the solid-state material comprises a sensing surface in proximity to the at least one spin defect, and the magnetometer further comprises a detector configured to detect output optical radiation or photocurrent correlated with an electronic spin of the spin defect. The device may further comprise any of an optical source configured to generate optical radiation and an RF source configured to generate RF radiation.

As an option, the device is selected from any one of a magnetometer, a maser, and an RF sensor.

According to a second aspect, there is provided a method of using a device that utilises an electronic Zeeman splitting effect. The method comprises providing a device comprising solid-state material, the solid-state material containing at least one spin defect. A bias magnetic field is generated using a magnetic-field generator. A compensation system is used, the compensation system configured to compensate for the effect of changes in temperature on the bias magnetic field. The compensation comprises a temperature sensor for measuring any of a temperature and a change in temperature of the magnetic-field generator, the compensation system further comprising a computer device configured to determine a change in the bias magnetic field as a result of a change in the measured temperature or the measured change in temperature, the computer device being further configured to adjust a predetermined bias magnetic field value using the determined change in bias magnetic field and using the value as an input to the compensation system to compensate for the effect of changes in temperature on the bias magnetic field.

As an option, the solid-state material is selected from any of diamond material and silicon carbide.

As a further option, the solid-state material itself is used to measure the temperature, the solid-state material being in thermal equilibrium with the magnetic field generator, and the change in temperature being determined by the drift in the zero-field splitting value of the spin defect.

Optionally, an intermediate material is disposed between and in thermal contact with the solid-state material and the magnetic field generator, the intermediate material being selected to conduct heat between the solid state material and the magnetic field generator.

BRIEF DESCRIPTION OF DRAWINGS

Non-limiting embodiments will now be described by way of example and with reference to the accompanying drawings in which.

DETAILED DESCRIPTION

In order to ensure that variations in $B_{bias}$ cause by variations in temperature are accounted for when obtaining $B_{unknown}$, the inventors have provided a compensation system to compensate for the effect of changes in temperature on the magnetic field.

The following description presents three exemplary types of compensation system, and note that a sensor device may utilise one, any two or all three of the exemplary compensation systems. Also note that devices that use diamond for electronic Zeeman splitting are described below, but this is exemplary only and the skilled person will appreciate that devices that utilise electronic Zeeman splitting effect can use other types of material such as silicon carbide.

Although outside the scope of the present invention, a first type of compensation system requires the implementation of a compensation scheme using a flux shunt. Effectively variations in $B_{bias}$ are compensated for by another magnetic field.

A second type of compensation system requires periodically taking precise measurements of the temperature (or changes in temperature) of the permanent bias magnet and mapping the change in temperature from a nominal value to an expected change in the magnetic field, and altering the value of $B_{bias}$ accordingly.

A third type of compensation system is a variation of the second; the diamond itself is configured to be in thermal equilibrium with the permanent bias magnet(s), and the temperature of the diamond, and hence the bias magnets, is measured using spin defects in the diamond themselves. Thermal equilibrium may be achieved, for example, by having the diamond sensor in thermal contact with the permanent bias magnet.

The following description refers to the NV spin defect in diamond, but it will be appreciated that other spin defects may also be used, such as the SiV centre or any other defects that display suitable properties of spin polarisation and spin readout.

Taking the first type of compensation system, which is exemplary only and outside the scope of the invention, the bias magnet(s) are "shunted" by the addition of a magnetically soft material that has a temperature coefficient that is inverse to that of the main magnetic material. The basic concept is described in Kim and Doose, "Temperature compensation of NdFeB permanent magnets", Proceedings of the 1997 Particle Accelerator conference". In this case, the flux shunt is provided for applications such as charged-beam storage rings, and for the creation of accelerometers, torquers and gyroscopes. Such a system could also be used for magnetometry using NV centres in a diamond crystal lattice.

As described in Kim and Doose, "At lower temperatures the shunt permeability increases, enabling the shunt to carry or divert more flux from the air gap of the magnet. At higher temperatures, the reverse condition exists: the shunt permeability decreases and less air-gap flux is diverted. In order to have higher temperature sensitivity, the shunt material should have a Curie point close to ambient temperature. Shunt materials made of Curie alloys (30-32% Ni—Fe) and Montel alloys (67% Ni—Cu—Fe) have relatively low Curie temperatures of less than 100° C.".

In the application of diamond magnetometry, compensation strips may be attached to the or each bias magnet to compensate for the variations in $B_{bias}$ with temperature.

Using such an approach it has been demonstrated that a temperature coefficient of 0.002%/° C. may be achieved for a NeFeB-based permanent magnet, which would be extremely advantageous for a NV-based B-field sensor. This corresponds to only a 2 nT shift in $B_{bias}$ for a 0.1° C. change in temperature (assuming $B_{bias}$=1 mT). In this manner such a sensor may be operated for a longer period of time without the need for a recalibration operation to remove temperature-induced drifts in $B_{total}$.

Figure 2:
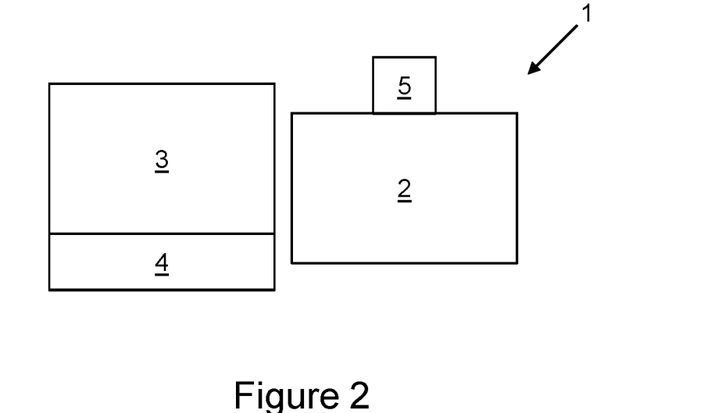
FIG. 2 illustrates schematically in a block diagram an exemplary sensor device using a flux shunt.

FIG. 2 herein illustrates schematically in a block diagram an exemplary sensor device 1 using a flux shunt according to the first type of compensation system. Note that this is by way of example only, and is outside the scope of the present invention. A diamond sensor 2 is provided that contains at least one spin defect located in proximity to a sensing surface. A magnetic field generator in the form of a bias magnet 3 is located in proximity to the diamond sensor 2. Shunt material 4 is also located in proximity to or co-located with the bias magnet. A detector 5 is provided, to detect optical radiation or photocurrent from the one or more spin defects.

Turning now to the second type of compensation system, this requires periodically taking precise measurements of the temperature (or changes in the temperature) of the permanent bias magnet and mapping the change in temperature from a nominal value to an expected change in the magnetic field, and altering $B_{bias}$ accordingly. Note that this can be used separately from the first type of compensation system, or alongside it.

Figure 3:
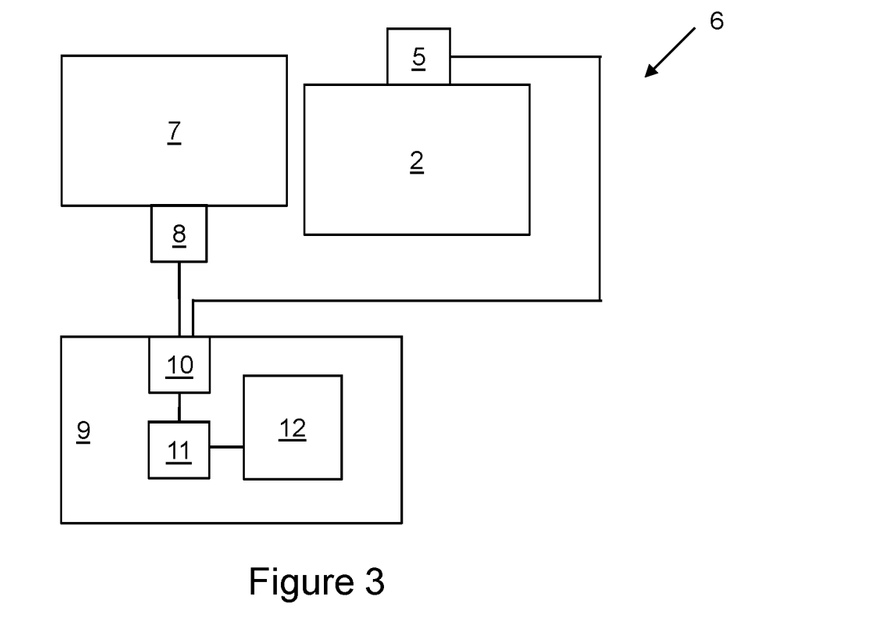
FIG. 3 illustrates schematically in a block diagram an exemplary sensor device using a temperature sensor.

Referring to FIG. 3 herein, the sensor device 6 comprises a diamond sensor 2 containing at least one spin defect located in proximity to a sensing surface. A bias magnet 7 is provided that has a well-characterised temperature coefficient. A temperature sensor 8 is also provided that precisely measures the temperature of the magnet 7.

A computer device 9 comprises a data input device 10 for receiving temperature data from the temperature sensor 8. A processor 11 either calculates (or accesses a look-up table 12) the change in $B_{bias}$ depending on the change in temperature measured by the temperature sensor. Calculation is performed by using the relationship between the change in temperature and the change in $B_{bias}$.

In this way the system $B_{bias}$ value (and hence $B_{total}$) may be periodically adjusted in order to compensate for temperature-induced shifts.

Inexpensive low-noise temperature sensors are available that can be mounted to the magnets. Absolute accuracy for the precise temperature is unimportant, as a measurement of the change in the temperature is all that is required to map the change of temperature to a change in $B_{bias}$. Assuming a repeatability of 0.01° C. in the measurement and combined with the enhanced temperature stability of 0.002%/° C. for an optimised NeFeB configuration, a change in bias field of 0.2 nT should be detectable and could be compensated for. In this manner the long-term drift in $B_{total}$ measured by a NV-based sensor could be reduced to this level by periodic measurement of the temperature.

Figure 4:
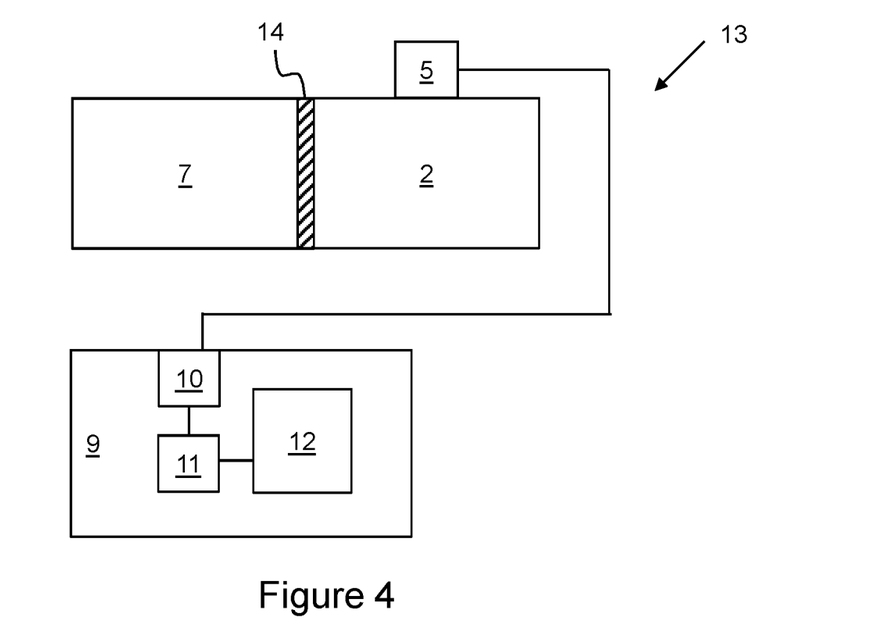
FIG. 4 illustrates schematically in a block diagram an exemplary sensor device using the diamond as a temperature sensor.

Turning now to FIG. 4, in a third type of compensation system, the measurement of the temperature of the magnet 7 is performed by measuring the temperature of the diamond 2 using the NV defect itself. Typically, this would be separate to the bias magnet(s) 7 and could be locally heated by the laser/LED used to excite the NV luminescence (and potentially applied RF). Hence a direct measurement of the magnet 7 temperature was suggested for the second type of compensation system. However, in the third type of compensation system, it is considered that the sensor device 13 may be configured such that the diamond 2 and magnet 7 are in thermal equilibrium with one another, for example by having a good thermal contact between them. Thermal contact is optionally maximised by using an intermediate material 14 that conducts heat, but does not affect the B-field flux. In this way, the drift in the zero-field splitting value of the NV centre may be monitored and $B_{bias}$ corrected using the measured temperature, provided the temperature-coefficient of the permanent magnet(s) is well characterised.

Figure 5:
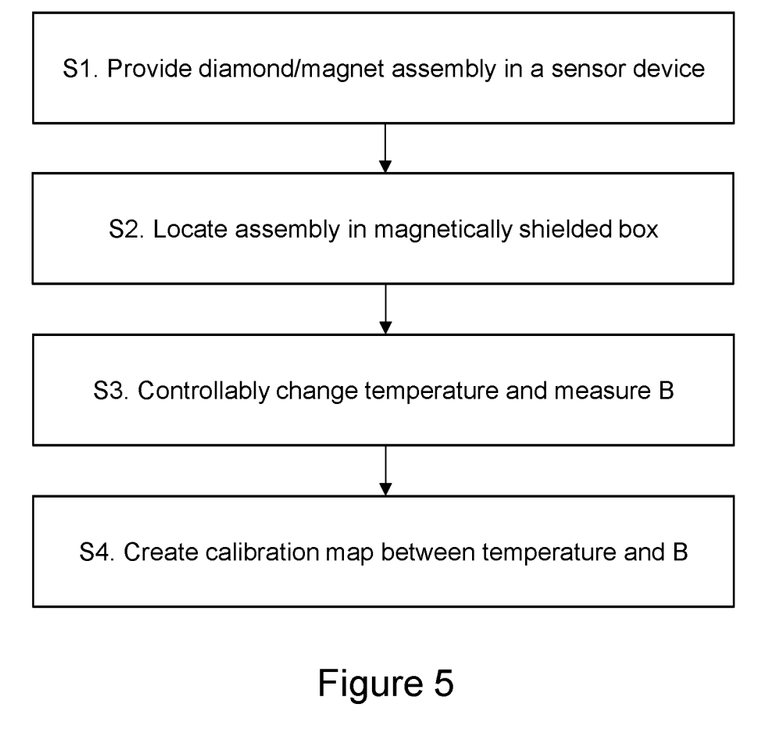
FIG. 5 is a flow diagram showing exemplary steps for calibrating a sensor device that uses diamond as a temperature sensor.

By way of example, in order to calibrate such a system, and with reference to FIG. 5, the following exemplary steps during construction are:

S1. Provide an assembly of a diamond 2 and a bias magnet 7 with a good thermal contact 14 between them, as illustrated in FIG. 3.

S2 Locate the assembly in a magnetically-shielded box.

S3. Take measurements of B, as recorded by the sensor, as the temperature is controllably changed. In this manner, changes in the bias field which are only caused by the change in temperature can be determined. As the diamond 2 is in a magnetically-shielded box it is known that changes in measured B only arise from changes in the $B_{bias}$. This calibration procedure is only required for the case where the diamond and bias field magnet are in thermal equilibrium.

S4. Create a calibration map between temperature change (as measured by NV centres in the diamond) and $B_{bias}$. The calibration map can be stored in a look-up table 12 or database, accessible by the processor 11 during operation to correct $B_{total}$ with changes in temperature.

Figure 6:
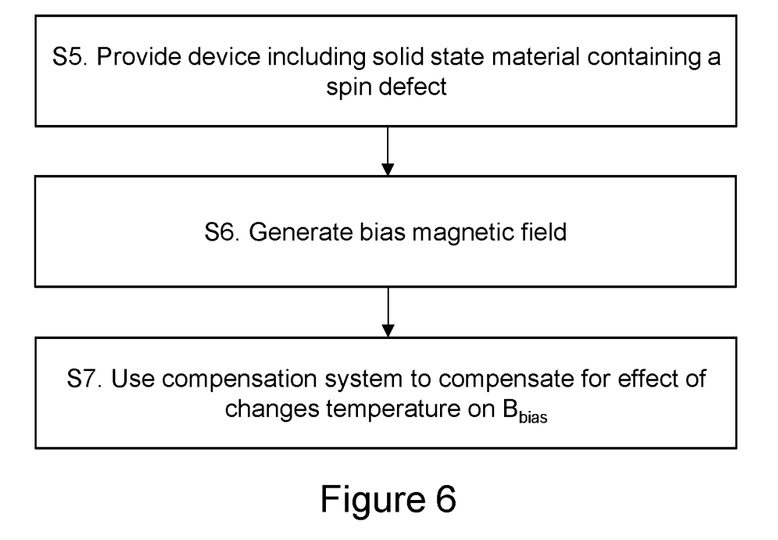
FIG. 6 is a flow diagram showing exemplary steps for use of a sensor device.

When the sensor device is in use, the following exemplary steps as shown in in FIG. 6 may occur:

S5. A device comprising solid-state material is provided, the solid-state material containing at least one spin defect;

S6. A bias magnetic field is generated using a magnetic-field generator;

S7. A compensation system is provided that is configured to compensate for the effect of changes in temperature on the bias magnetic field. As described above, this is based on temperature measurements to compensate the values of the bias magnetic field, and may be used in combination with a flux shunt.

Figure 1:
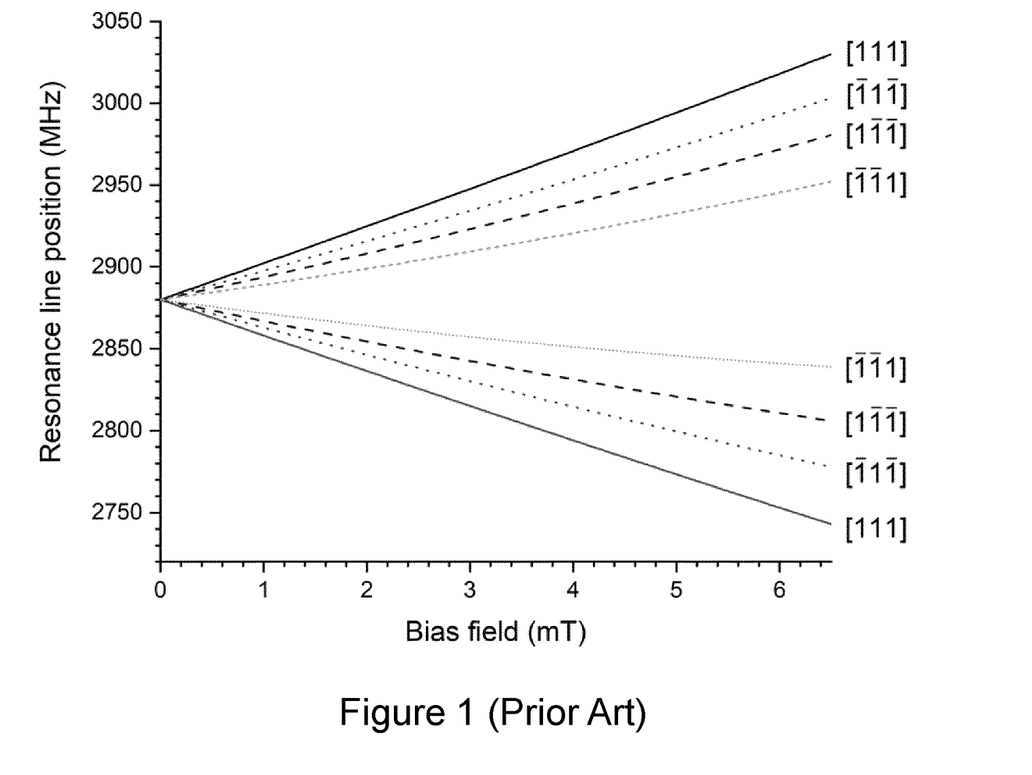
FIG. 1 shows resonance line positions relative to a bias field.
Figure 7:
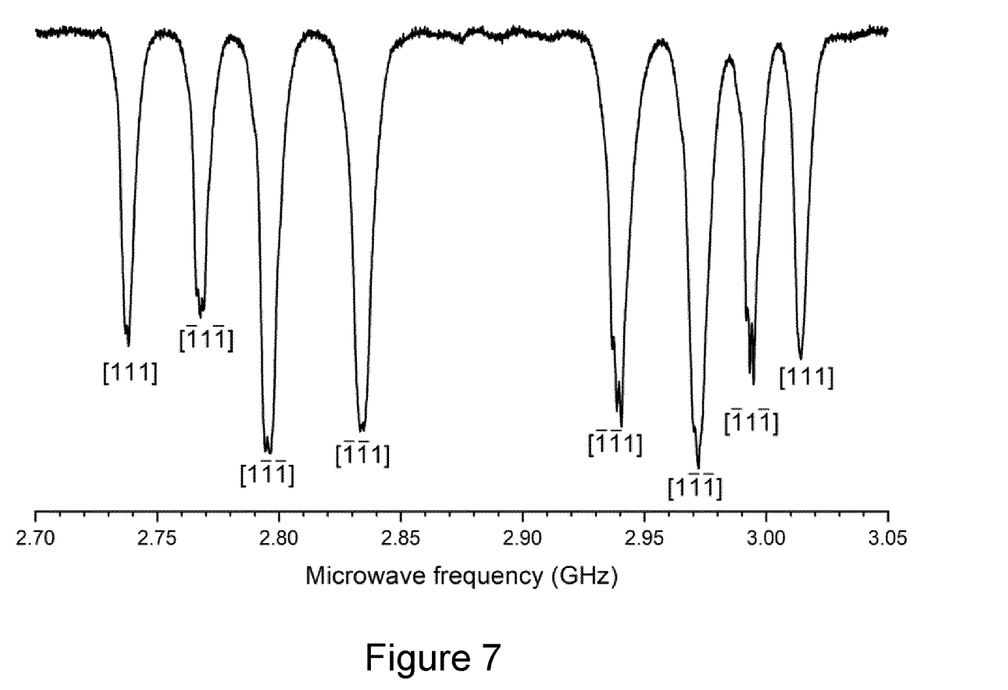
FIG. 7 shows exemplary distinct and resolvable resonance lines from ODMR.

By way of example. a magnetic-field generator may consist of a non-temperature-stabilised NeFeB magnet. This is configured to have a magnetic field along a direction that makes a different orientation with respect to each of the four <111> NV axes in NV containing diamond, and the magnetic field is of sufficient strength to resolve all 8 resonance lines (required for a vector-sensing modality). In this example, a sensor was constructed that had a magnetic field strength of approximately 6 mT along an angle of (18, 29)°, where this is specified in a spherical-polar angular sense (where [111] is defined as (54.7, 45)°). FIG. 7 shows the resultant ODMR and how the distinct resonance lines are clearly resolved. FIG. 1 shows how the splitting of the resonance lines changes as a function of bias-field strength at this fixed angle. This illustrates that, in practice, the applied bias field must be >2 mT for the lines to be clearly resolved due to finite width of the resonance lines (inversely-related to coherence time) and the additional N hyperfine splitting. If the bias field fluctuates owing to changes in temperature, this is compensated for by calculations based on the measured temperature or changes in the measured temperature can compensate for the changes in the bias magnetic field. The compensated bias magnetic field is then used for further calculations.

The invention as defined in the appended claims has been shown and described with reference to the embodiments above. However, it will be understood by those skilled in the art that various changes in form and detail may be made without departing from the scope of the invention as defined by the appended claims.

Furthermore, while the above description focuses on magnetometers, other applications such as masers may benefit from compensation systems that compensate for an effect of changes in temperature on the bias magnetic field.

Diamond based room temperature masers utilise the fact that if you apply a sufficient magnetic field (>102.5 mT), the $M_s=-1$ state of the NV-defect is below the $M_s=0$ state. Applying irradiation at optical wavelengths (e.g. 532 nm) pumps the NV defect into the $M_s=0$ which now creates a population inversion. If a solid-state material such as NV containing diamond is contained in a cavity (optimised for the magnetic field and microwave wavelengths) then stimulated emission can generate a coherent microwave source.

As described above, variations in temperature can cause variation in the applied magnetic field, which changes the energy gap between the $M_s=-1$ and $M_s=0$ states and therefore changes the emission wavelength. In some situations, the maser may be subject to an environment where the temperature changes (e.g. space-based applications). This can change the strength of the applied magnetic field and thereby change the wavelength of emission. It is therefore useful in this situation to know the effect of temperature changes on the wavelength of emission, or to use a compensation system to compensate for these variations.

The invention claimed is:

1. A device that utilizes an electronic Zeeman splitting effect, the device comprising:
    a solid-state material, wherein the solid-state material comprises at least one spin defect;
    a magnetic field generator configured to generate a bias magnetic field;
    a compensation system to compensate for an effect of changes in temperature on the bias magnetic field;
    wherein the compensation system comprises a temperature sensor configured to measure any of a temperature and a change in temperature of the magnetic field generator, and a computer device configured to determine a change in the bias magnetic field as a result of a change in the measured temperature or the measured change in temperature, the computer device being further configured to adjust a predetermined bias magnetic field value using the determined change in bias magnetic field and using the value as an input to the compensation system to compensate for the effect of changes in temperature on the bias magnetic field.

2. The device according to claim 1, wherein the solid-state material is selected from the group consisting of diamond material and silicon carbide.

3. The device according to claim 1, wherein the solid-state material is diamond material, the diamond material being selected from the group consisting of a nanocrystal, a bulk diamond sample, and a composite diamond sample comprising diamond regions with different properties.

4. The device according to claim 3, wherein the spin defect is selected from the group consisting of a negatively charged nitrogen vacancy centre, a silicon-vacancy centre, a nickel-related defect, a chromium-related defect, a tin-vacancy centre and a germanium vacancy centre.

5. The device according to claim 1, wherein the solid-state material is the temperature sensor, the solid-state material being in thermal equilibrium with the magnetic field generator and the change in temperature being determined by the drift in the zero-field splitting value of the spin defect.

6. The device according to claim 1, further comprising an intermediate material disposed between and in contact with both the solid-state material and the magnetic field generator, the intermediate material being selected to conduct heat between the solid-state material and the magnetic field generator.

7. The device according to claim 1, wherein the device is a magnetometer, and wherein:
   the solid-state material comprises a sensing surface in proximity to the at least one spin defect; and
   the magnetometer further comprises a detector configured to detect output optical radiation or photocurrent correlated with an electronic spin of the spin defect.

8. The device according to claim 7, further comprising an optical source configured to generate optical radiation.

9. The device according to claim 7, further comprising an RF source configured to generate RF radiation.

10. The device according to claim 1, wherein the device is selected from the group consisting a magnetometer, a maser, an RF sensor, and a spectrum analyser.

11. A method of using a device that utilises utilizes an electronic Zeeman splitting effect, the method comprising:
    providing a device comprising solid-state material, the solid-state material containing at least one spin defect;
    generating a bias magnetic field using a magnetic field generator;
    using a compensation system configured to compensate for the effect of changes in temperature on the bias magnetic field; and
    wherein the compensation system comprises a temperature sensor for measuring any of a temperature and a change in temperature of the magnetic field generator, the compensation system further comprising a computer device configured to determine a change in the bias magnetic field as a result of a change in the measured temperature or the measured change in temperature, the computer device being further configured to adjust a predetermined bias magnetic field value using the determined change in bias magnetic field and using the value as an input to the compensation system to compensate for the effect of changes in temperature on the bias magnetic field.

12. The method according to claim 11, wherein the solid-state material is selected from the group consisting of diamond material and silicon carbide.

13. The method according to claim 11, further comprising using the solid-state material to measure the temperature, the solid-state material being in thermal equilibrium with the magnetic field generator, and the change in temperature being determined by the drift in the zero-field splitting value of the spin defect.

14. The method according to claim 13, further comprising providing an intermediate material disposed between and in thermal contact with the solid-state material and the magnetic field generator, the intermediate material being selected to conduct heat between the solid-state material and the magnetic field generator.

\* \* \* \* \*